(12) United States Patent
Noda

(10) Patent No.: US 6,266,541 B1
(45) Date of Patent: Jul. 24, 2001

(54) PORTABLE RADIO SIGNAL TRANSCEIVER AND METHOD OF PREVENTING DISALLOWED USE THEREOF

(75) Inventor: Saneyuki Noda, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/387,779

(22) Filed: Sep. 1, 1999

(30) Foreign Application Priority Data

Sep. 1, 1998 (JP) .................................................. 10-247324

(51) Int. Cl.$^7$ ....................................................... H04B 1/38
(52) U.S. Cl. ............................ 455/565; 455/567; 455/410
(58) Field of Search .................................. 455/565, 567, 455/410, 411, 415, 403, 575; 379/196, 374, 58, 60; 340/568, 540, 825.44

(56) References Cited

U.S. PATENT DOCUMENTS

| | | | |
|---|---|---|---|
| 3,801,745 | * | 4/1974 | Zucherman ........................ 179/7.1 R |
| 4,682,148 | * | 7/1987 | Ichikawa et al. .................. 340/311.1 |
| 4,802,203 | * | 1/1989 | Muller et al. ........................... 379/80 |
| 4,881,259 | * | 11/1989 | Scordato ................................. 379/58 |
| 5,073,767 | * | 12/1991 | Holmes et al. ................... 340/311.1 |
| 5,471,204 | * | 11/1995 | Kudoh et al. ................... 340/825.44 |
| 5,627,886 | * | 5/1997 | Bowman .............................. 379/111 |
| 5,646,604 | * | 7/1997 | Maruyama et al. ............ 340/825.31 |
| 5,696,497 | * | 12/1997 | Mottier et al. .................. 340/825.44 |
| 5,769,338 | * | 8/1998 | Mardirossian ....................... 340/568 |
| 5,796,338 | * | 8/1998 | Mardirossian ....................... 340/568 |
| 5,801,627 | * | 9/1998 | Hartung ................................ 340/568 |
| 5,862,472 | * | 1/1999 | Park ...................................... 455/411 |
| 5,870,684 | * | 2/1999 | Hoashi et al. ....................... 455/567 |
| 5,907,602 | * | 5/1999 | Peel et al. .......................... 3790/114 |

FOREIGN PATENT DOCUMENTS

| | | | |
|---|---|---|---|
| 2304001 | 3/1997 | (GB) | .............................. H04M/7/32 |
| 6-125305 | 5/1994 | (JP) | ................................ H04B/7/26 |
| 6-216841 | 8/1994 | (JP) | ................................ H04B/7/26 |
| 9-182158 | 7/1997 | (JP) | ................................ H04Q/7/38 |

* cited by examiner

Primary Examiner—Daniel Hunter
Assistant Examiner—C. Chow
(74) Attorney, Agent, or Firm—McGinn & Gibb, PLLC

(57) ABSTRACT

There is provided a portable radio signal transceiver including (a) an annunciator which annunciates a user that there has been a call, (b) a counter which counts both the number of calls having been made in a predetermined period of time and the number of annunciation made by the annunciator when there is a call, (c) a memory storing therein a predetermined condition for locking a dial, the predetermined condition including the predetermined number N1 of annunciation and the predetermined number N2 of calls, and (d) a controller which causes the portable radio signal transceiver to carry out dial-locking, if the numbers of annunciation and calls counted by the counter are equal to the predetermined numbers N1 and N2, respectively. The portable radio signal transceiver makes it possible to be dial-locked from a remote place. Hence, it is possible to prevent the portable radio signal transceiver from being illegally used by others, for instance, when a user has mislaid the transceiver, ensuring enhancement of security.

20 Claims, 3 Drawing Sheets

PORTABLE RADIO SIGNAL TRANSCEIVER AND METHOD OF PREVENTING DISALLOWED USE THEREOF

BACKGROUND OF THE INVENTION

1. Field of the Invention

The invention relates to a portable radio signal transceiver, and more particularly to prevention of disallowed use of a portable radio signal transceiver not held by an owner due to loss, theft and so on.

2. Description of the Related Art

With recent popularization of a movable communication terminal such as a portable radio signal transceiver and PHS, there is caused a problem that a movable communication terminal is not held by an owner due to loss, mislaying, theft and so on, and is illegitimately used by others.

In order to prevent such illegitimate use by others, there has bee used a movable communication terminal provided with a dial-locking function. This dial-locking function is a function by which a movable communication terminal is restricted to operate until a predetermined step, such as input of a predetermined pass-code, is carried out. Here in the specification, a word "dial-lock mode" indicates a state in which a movable communication terminal is restricted to operate by the dial-lock function, and a word "non dial-lock mode" indicates a state in which a movable communication terminal is not restricted to operate.

Hereinbelow is explained the dial-lock function in a conventional movable communication terminal.

First, there is explained a movable communication terminal having a basic dial-lock function, as first prior art. In the movable communication terminal, a pass number is stored in advance therein. The movable communication terminal is automatically transferred to a dial-lock mode when a certain operation is carried out to the movable communication terminal through a keyboard or when the movable communication terminal is turned off. When the dial-lock mode is to be cancelled, the pass number is input into the movable communication terminal through a keyboard.

Japanese Unexamined Patent Publication No. 6-216841 as second prior art has suggested a movable communication terminal which automatically transfers to a dial-lock mode when a certain period of time passes after a non dial-lock mode has started or a call has finished. The second prior art is more advantageous than the above-mentioned first prior art in that the movable communication terminal automatically transfers to a dial-lock mode even if a user does not intend to do so, ensuring enhancement in security.

Japanese Unexamined Patent Publication No. 6-125305 as third prior art has suggested a movable communication terminal which automatically responds to a call transmitted from another terminal, checks as to whether a present user is an legitimate user by virtue of a pass number having been stored in advance therein, transfers to a dial-lock mode by remote control, and displays information about a legitimate user on a display screen to thereby urge a person having the terminal in his hands to make a call to an owner.

A function by which a movable communication terminal can be dial-locked from a remote place, such as one suggested in the third prior art, is called a remote dial-lock function. The third prior art is more advantageous than the first prior art in that the movable communication terminal in the third prior art can be put into a dial-lock mode after a legitimate user has noticed that the movable communication terminal had been mislaid.

Japanese Unexamined Patent Publication No. 9-182158 as fourth prior art has suggested a portable radio signal transceiver which is capable of preventing illegitimate use thereof. In case of loss and theft, an owner of a portable radio signal transceiver registers mandatory lock data into a memory equipped in a base station through another telephone. A central processing unit in the portable radio signal transceiver reads out ID number from a memory, when a key for starting a call is actuated, and then, transmits a request for registration of location to the base station. The base station reads out the mandatory lock data out of the memory, based on the ID number, and transmits the mandatory lock data to the telephone. The telephone stores the mandatory lock data in a memory, and establishes a first flag in RAM when the mandatory lock data is indicative of disallowance in radio signal transmission, or a second flag in RAM when the mandatory lock data is indicative of allowance in radio signal transmission. When the first flag is established, data about operation having been input through keys is made invalid, whereas when the second flag is established, data about operation having been input through keys is made valid.

However, the above-mentioned first to fourth prior art are accompanied with problems as follows.

The first prior art is accompanied with a problem that it is impossible to transfer the movable communication terminal into a dial-lock mode, if a user actually has the movable communication terminal in his hands. In other words, it would be impossible to prevent illegitimate use, if the movable communication terminal is set in a dial-lock mode when the movable communication terminal is away from a user.

This problem may be solved, if the movable communication terminal is always set in a dial-lock mode when a legitimate user does not use the movable communication terminal. However, this solution is accompanied with another problem that it will be necessary to set or cancel a dial-lock mode each time the movable communication terminal is used, which deteriorates serviceability of the movable communication terminal.

In accordance with the second prior art, it would not be necessary for a legitimate user to have a habit of setting the movable communication terminal into a dial-lock mode after using the movable communication terminal, since the movable communication terminal is automatically transferred into a dial-lock mode, if a certain period of time has passed. However, since the movable communication terminal is put in a dial-lock mode if a certain period of time has passed, a user has to cancel a dial-lock mode each time a user uses the movable communication terminal, unless a user successively uses the movable communication terminal.

In accordance with the third prior art, it is possible to set the movable communication terminal into a dial-lock mode by remote control even after a legitimate user has noticed loss of the movable communication terminal. However, since the movable communication terminal in the third prior art checks as to whether a present user is a legitimate user or not after making a response to a call, it is unavoidable for the movable communication terminal to automatically make a response to a unconcerned call from others.

The portable radio signal transceiver in accordance with the fourth prior art is accompanied with a problem that it is necessary for a legitimate user to use another telephone in order to dial-lock the portable radio signal transceiver.

SUMMARY OF THE INVENTION

In view of the above-mentioned problems in the prior art, it is an object of the present invention to provide a portable radio signal transceiver which is capable of preventing illegitimate use thereof by others without deterioration in serviceability thereof.

It is also an object of the present invention to provide a method of controlling a portable radio signal transceiver which is capable of doing the same.

In one aspect of the present invention, there is provided a portable radio signal transceiver including (a) an annunciator which annunciates a user that there has been a call, and (b) a controller which compares both the number of calls having been made in a predetermined period of time and the number of annunciation made by the annunciator when there is a call to the predetermined numbers, and which disallows the portable radio signal transceiver to carry out a predetermined function, if the numbers of calls and annunciation are equal to the predetermined numbers.

For instance, the annunciator may be comprised of a ringer and/or an oscillator which oscillates the portable radio signal transceiver.

For instance, the portable radio signal transceiver may constitute a cellular phone or a terminal in personal handy phone system (PHS).

There is further provided a portable radio signal transceiver including (a) an annunciator which annunciates a user that there has been a call, (b) at least one counter which counts both the number of calls having been made in a predetermined period of time and the number of annunciation made by the annunciator when there is a call, (c) a memory storing therein a predetermined condition for locking a dial, the predetermined condition including the predetermined number N1 of annunciation and the predetermined number N2 of calls, and (d) a controller which causes the portable radio signal transceiver to carry out dial-locking, if the numbers of annunciation and calls counted by the counter are equal to the predetermined numbers N1 and N2, respectively.

For instance, the counter may be comprised of (b1) a timer which times the passage of the predetermined period of time, (b2) a first counter which counts the number of annunciation, and (b3) a second counter which counts the number of calls.

For instance, the controller may be designed to deem that the numbers of annunciation and calls are coincident with the predetermined condition, when the first counter counts the number of annunciation by N1×N2 and the second counter counts the number of calls by N2.

In another aspect of the present invention, there is provided a method of controlling a portable radio signal transceiver, including the steps of (a) counting the number of calls having been made in a predetermined period of time, (b) counting the number of annunciation made when there is a call, (c) comparing the number of calls and annunciation to the predetermined numbers, and (d) disallowing the portable radio signal transceiver to carry out a predetermined function, if the numbers of calls and annunciation are equal to the predetermined numbers.

There is further provided a method of controlling a portable radio signal transceiver, including the steps of (a) determining a condition for locking a dial, the condition including the predetermined number N1 of annunciation and the predetermined number N2 of calls, (b) counting the number of calls having been made in a predetermined period of time, (c) counting the number of annunciation made when there is a call, (d) comparing the number of annunciation and calls to N1 and N2, respectively, and (e) causing the portable radio signal transceiver to carry out dial-locking, if the numbers of annunciation and calls are equal to N1 and N2, respectively.

The advantages obtained by the aforementioned present invention will be described hereinbelow.

The portable radio signal transceiver in accordance with the present invention makes it possible to be dial-locked from a remote place. Accordingly, it is possible to prevent the portable radio signal transceiver from being illegitimately used by others, for instance, when a user has mislaid the transceiver, ensuring enhancement of security.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
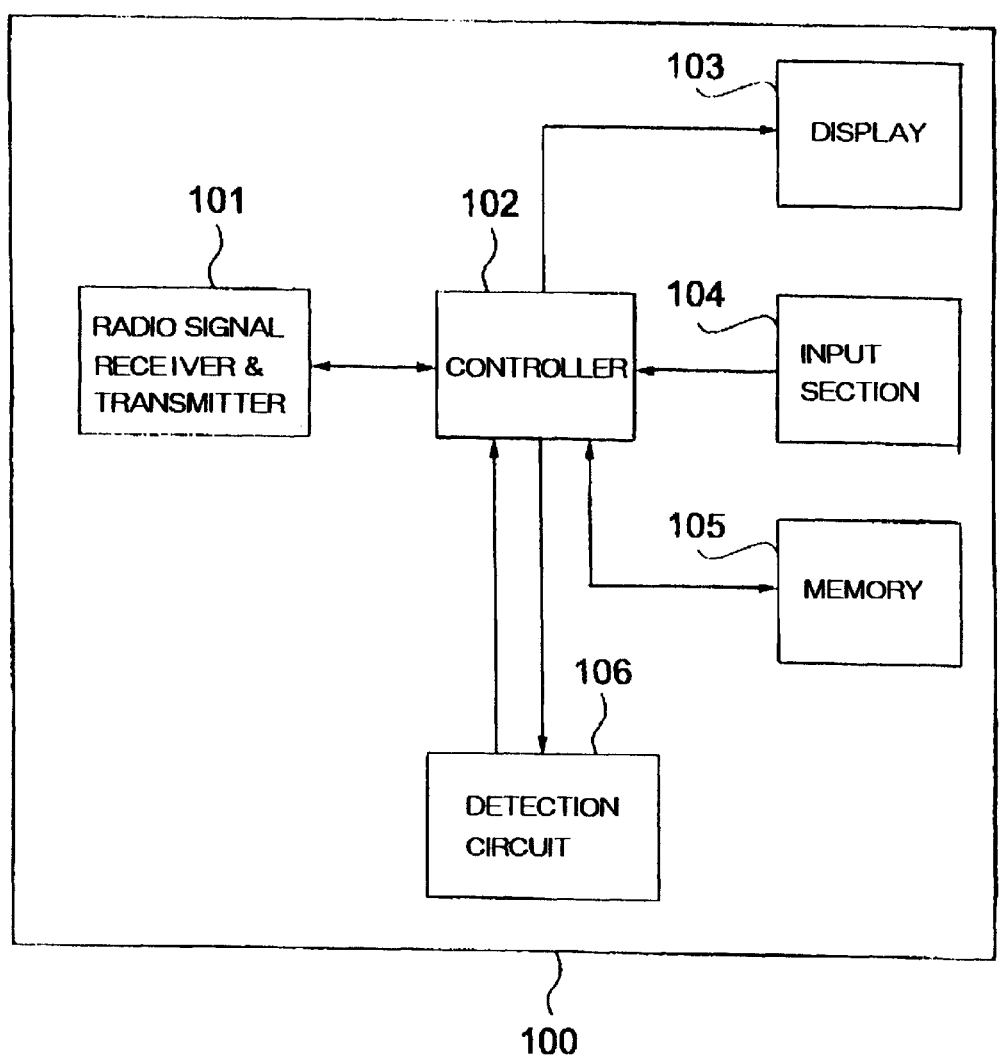
FIG. 1 is a block diagram of a portable radio signal transceiver in accordance with an embodiment of the present invention.

FIG. 1 is a block diagram of a portable radio signal transceiver in accordance with an embodiment of the present invention.

The illustrated portable radio signal transceiver 100 is comprised of a radio signal receiver and transmitter 101, a controller 102, a display 103, an input section 104, a memory 105, and a detection circuit 106. The radio signal receiver and transmitter 101, the display 103, the input section 104, the memory 105, and the detection circuit 106 are all electrically connected to the controller 102, and controlled by the controller 102.

The radio signal receiver and transmitter 101 receives a signal indicative that there has been a call to the portable radio signal transceiver 100, from a base station (not illustrated) through radio wiring network.

When a dial-lock mode is established or cancelled through the input section 104, the controller 102 stores establishment and cancellation of a dial-lock mode in the memory 105. When there has been a call to the portable radio signal transceiver 100, the controller 102 transmits the fact that the radio signal receiver and transmitter 101 has received a call and the number of annunciation made for informing a user that there is a call, to the detection circuit 106. In addition, the controller 102 receives an output signal transmitted from the detection circuit 106, and accordingly, establishes a dial-lock mode.

A state of the portable radio signal transceiver 100 and whether a dial-lock mode is established or cancelled are displayed in the display 103.

An input for establishing or canceling a dial-lock mode of the portable radio signal transceiver 100 is introduced into the controller 102 through the input section 104.

Whether a dial-lock mode is established or cancelled is stored in the memory 105.

The detection circuit 106 detects whether a signal having been received in the radio signal receiver and transmitter 101 is coincident with a condition for establishing a dial-lock mode.

Figure 2:
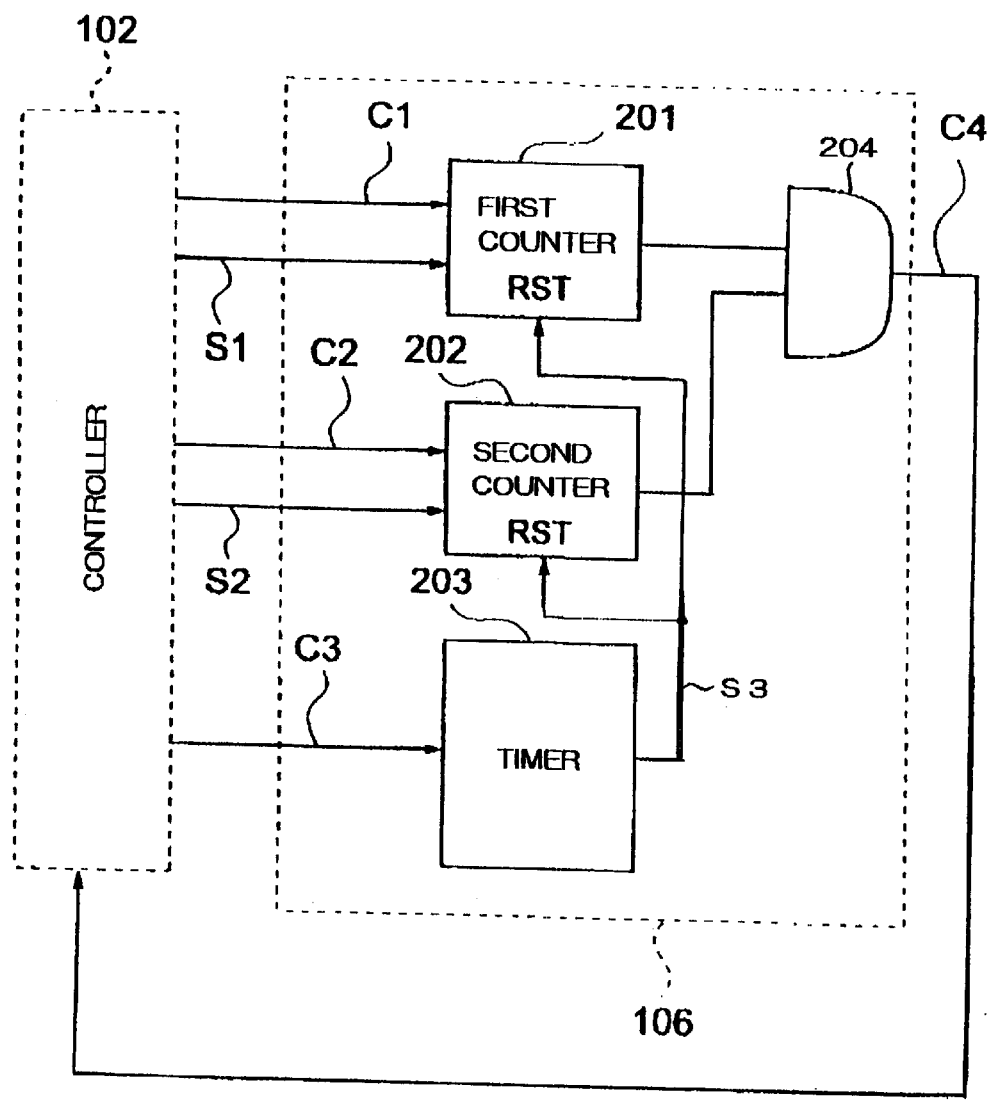
FIG. 2 is a block diagram of the detection circuit.

FIG. 2 is a block diagram of the detection circuit 106. As illustrated in FIG. 2, the detection circuit 106 is comprised of a first counter 201, a second counter 202, a timer 203, and AND circuit 204.

The controller 102 transmits a signal S1 each time a ringer rings. The first counter 201 counts the number of the signals S1 until the number of the signals S1 reaches the number indicated by a control signal C1 transmitted from the controller 102.

The controller 102 transmits a signal S2 each time there is a call. The second counter 202 counts the number of the signals S2 until the number of the signals S2 reaches the number indicated by a control signal C2 transmitted from the controller 102.

The timer 203 prevents the portable radio signal transceiver 100 from being unexpectedly transferred into a dial-lock mode when ordinary calls which are not intended to transfer the portable radio signal transceiver 100 to a dial-lock mode are repeated while a remote dial-lock function is indicated available. When there is a call to the portable radio signal transceiver 100, the timer 203 receives an initial signal C3 from the controller 102, and starts operation. The timer 203 times a predetermined period of time, and transmits signals S3 to both the first and second counters 201 and 202 when the predetermined period of time has passed. On receipt of the signals S3, the first and second counters 201 and 202 initializes their counts.

Figure 3:
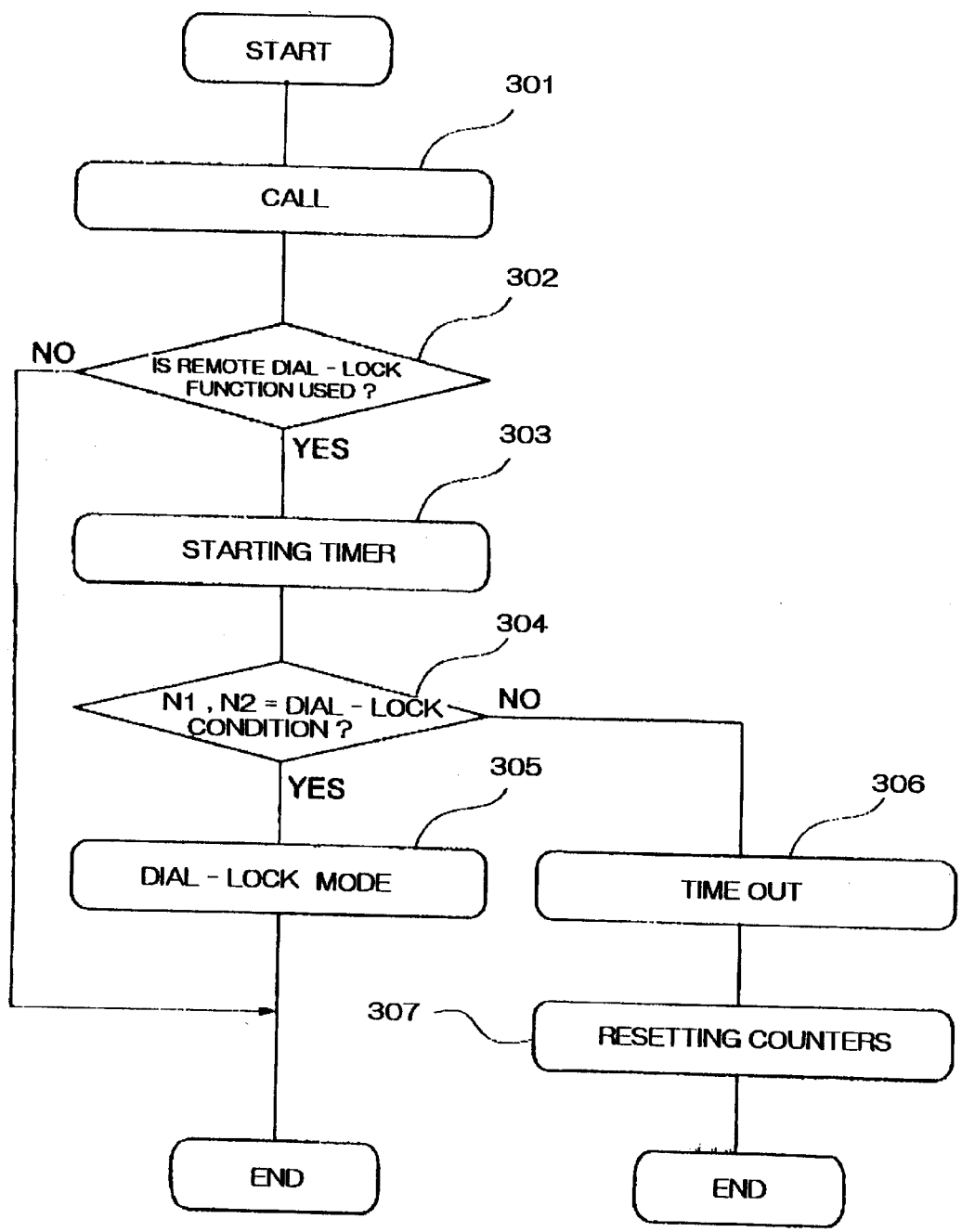
FIG. 3 is a flow chart showing a process for carrying out remote dial-lock in the portable radio signal transceiver in accordance with the embodiment of the present invention.

An operation of the portable radio signal transceiver 100 is explained hereinbelow with reference to FIG. 3.

The portable radio signal transceiver 100 in accordance with the embodiment has a remote dial-lock function. That is, the portable radio signal transceiver 100 in advance stores therein a dial-lock condition including a combination of the number of calls and the number of annunciation such as ringing of a ringer. The dial-lock condition acts as a trigger for the portable radio signal transceiver 100 to transfer into a dial-lock mode.

First, a legitimate user establishes a condition for carrying out a remote dial-lock condition. The legitimate user inputs data into the controller 102 through the input section 104 in accordance with an indication or a dial-lock menu displayed in the display 103 for setting a remote dial-lock function or other functions. In the dial-lock menu, there are made an indication as to whether a remote dial-lock function is to be used or not and a condition necessary for the portable radio signal transceiver 100 to transfer into a dial-lock mode. Herein, the dial-lock condition is comprised of a combination of the number N1 of ringing of a ringer per a call and the number N2 of calls.

The number N1 of ringing of a ringer is equal to the number of the signals S1 which the controller 102 transmits when a ringer rings, and the number of N2 of calls is equal to the number of the signals S2 which the controller 102 transmits when the controller 102 recognizes that there is a call.

For instance, when the remote dial-lock function is designated to use, and the dial-lock condition (N1, N2) is determined to be equal to (2, 2), the portable radio signal transceiver 100 is transferred into the dial-lock mode if there are two calls in each of which a ringer rings twice.

The indication as to whether the remote dial-lock function is used or not and the dial-lock condition are both stored in the memory 105. The indication as to whether the remote dial-lock function is used or not is used when it is judged as to whether the detection circuit 106 is to start or not.

The numbers N1 and N2 are transmitted to the detection circuit 106, and are used for designating the count number of the first and second counters 201 and 202. The first counter 201 transmits a signal when it counts the signals S1 by the number of (N1×N2), and the second counter 202 transmits a signal when it counts the signals S2 by the number of N2.

Hereinbelow is explained an operation of the portable radio signal transceiver 100 after the dial-lock condition has been established and there has been a call until the portable radio signal transceiver 100 is transferred into the dial-lock mode, with reference to FIG. 3.

When there is a call, data about the call, having been received at the radio signal receiver and transmitter 101, is transmitted to the controller 102 in step 301.

Then, the controller 102 reads the indication as to whether the remote dial-lock function is used or not, out of the memory 105 in step 302.

If the remote dial-lock function is designated to use (YES in step 302), the controller 102 transmits the initial signal C3 to the timer 203 to thereby start the timer 203, in step 303. A timer count, that is, a period of time measured by the timer 203 is variable in a lot of steps in accordance with (N1×N2), and is determined when the numbers N1 and N2 are established. For instance, the timer count is determined to be about 30 seconds, if N1×N2 is equal to or smaller than 5 (N1×N2<5). As an alternative, the timer count is determined to be about 60 seconds, if N1×N2 is greater than 5, but is equal to or smaller than 10 (5<N1×N2<10).

While the timer 203 times the timer count after the timer 203 has started, it is judged in step 304 as to whether the numbers N1 and N2 are coincident with the dial-lock condition. The controller 102 transmits the signal S2 to the second counter 202, based on the call data, and the thus transmitted signals S2 are counted by the second counter 202. Similarly, the controller 102 transmits the signal S1 to the first counter 201, and the thus transmitted signals S1 are counted by the first counter 201.

When counts of the first and second counters 201 and 202 are coincident with the dial-lock condition (YES in step 304), that is, when a count of the first counter 201 becomes equal to (N1×N2), and a count of the second counter 202 becomes equal to N2, AND circuit 204 in the detection circuit 106 transmits a control signal C4. Receiving the control signal C4, the controller 102 transfers the portable radio signal transceiver 100 into the dial-lock mode in step 305.

If counts of the first and second counters 201 and 202 do not become coincident with the dial-lock condition until the timer 203 times the predetermined timer count (step 306), the timer 203 transmits reset signals to the first and second counters 201 and 202 to thereby initialize the first and second counters 201 and 202 in step 307.

When the remote dial-lock function is to be cancelled, a pass number is directly input into the portable radio signal transceiver 100 through the input section 104, similarly to when the portable radio signal transceiver 100 is to be dial-locked.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-247324 filed on Sep. 1, 1998 including specification, claims, drawings and summary is incorporated herein by reference in its entirety.

What is claimed is:

1. A portable radio signal transceiver comprising:

(a) an annunciator which annunciates a call; and (b) a controller which compares a number of calls over a predetermined period of time and a number of annunciations made by said annunciator, with predetermined numbers, and which prevents said portable radio signal transceiver from performing a predetermined function, if at least one of said number of calls and said number of annunciations is equal to said predetermined numbers.

2. The portable radio signal transceiver as set forth in claim 1, wherein said annunciator comprises at least one of a ringer and a vibrator which vibrates said portable radio signal transceiver.

3. The portable radio signal transceiver as set forth in claim 1, wherein said portable radio signal transceiver comprises one of a telephone and a terminal in a personal handy phone system (PHS).

4. A portable radio signal transceiver comprising:

(a) an annunciator which annunciates a call;

(b) at least one counter which counts a number of calls over a predetermined period of time and a number of annunciations made by said annunciator;

(c) a memory storing therein predetermined conditions for locking a dial of said transceiver, said predetermined conditions comprising:
a predetermined number N1 of annunciations, and
a predetermined number N2 of calls; and (d) a controller which causes said portable radio signal transceiver to perform dial-locking, if at least one of said number of annunciations and said number of calls counted by said counter are equal to said predetermined numbers N1 and N2, respectively.

5. The portable radio signal transceiver as set forth in claim 4, wherein said counter is comprised of:

(b1) a timer which times a passage of said predetermined period of time;

(b2) a first counter which counts a number of annunciations; and (b3) a second counter which counts a number of calls.

6. The portable radio signal transceiver as set forth in claim 5, wherein said controller determines whether said number of annunciations and said number of calls are coincident with said predetermined conditions, when said first counter counts a number of annunciations by N1×N2 and said second counter counts a number of calls by N2.

7. The portable radio signal transceiver as set forth in claim 4, wherein said annunciator is comprised of at least one of a ringer and a vibrator which vibrates said portable radio signal transceiver.

8. The portable radio signal transceiver as set forth in claim 4, wherein said portable radio signal transceiver comprises one of a cellular phone and a terminal in a personal handy phone system (PHS).

9. A method of controlling a portable radio signal transceiver, comprising:

(a) counting a number of calls over a predetermined period of time;

(b) counting a number of annunciations made when there is a call;

(c) comparing a number of calls and a number of annunciations to predetermined numbers; and (d) preventing said portable radio signal transceiver from performing a predetermined function, if at least one of said number of calls and said number of annunciations is equal to said predetermined numbers.

10. A method of controlling a portable radio signal transceiver, comprising:

(a) determining a condition for locking a dial of said portable radio transceiver, said condition including a predetermined number N1 of annunciations and a predetermined number N2 of calls;

(b) counting a number of calls over a predetermined period of time;

(c) counting a number of annunciations made when there is a call;

(d) comparing a number of annunciations and a number of calls to N1 and N2, respectively; and (e) causing said portable radio signal transceiver to perform dial-locking, if at least one of said number of annunciations and said number of calls is equal to N1 and N2, respectively.

11. The portable radio signal transceiver according to claim 1, wherein said at least one of said number of calls and said number of annunciations comprises both said number of calls and said number of annunciations.

12. The portable radio signal transceiver according to claim 4, wherein said at least one of said number of annunciations and said number of calls counted by said counter comprises both said number of annunciations and said number of calls counted by said counter.

13. The method of controlling a portable radio signal transceiver according to claim 9, wherein said at least one of said number of calls and said number of annunciations comprises both said number of calls and said number of annunciations.

14. The method of controlling a portable radio signal transceiver according to claim 10, wherein said at least one of said number of annunciations and said number of calls comprises both said number of annunciations and said number of calls.

15. The portable radio signal transceiver according to claim 1, wherein said predetermined function comprises generating an outgoing telephone call.

16. The portable radio signal transceiver according to claim 1, wherein said portable radio signal transceiver performs dial-locking when said portable radio signal transceiver is not in the possession of an authorized user.

17. The portable radio signal transceiver according to claim 4, wherein said portable radio signal transceiver performs dial-locking when said portable radio signal transceiver is not in the possession of an authorized user.

18. The portable radio signal transceiver according to claim 3, wherein said telephone comprises a cellular telephone.

19. The portable radio signal transceiver according to claim 1, further comprising:

a memory which stores said predetermined function and said predetermined numbers.

20. The portable radio signal transceiver according to claim 1, wherein a user disengages said controller from preventing said portable radio signal transceiver from performing said predetermined function by inputting a pass number into said portable radio signal transceiver.

* * * * *